United States Patent
Rauh

(10) Patent No.: US 9,017,751 B2
(45) Date of Patent: Apr. 28, 2015

(54) METHOD AND AN APPARATUS FOR DETERMINING THE RESIDUAL TIME UNTIL A COOKING PROCESS OF A FOODSTUFF HAS BEEN FINISHED

(75) Inventor: Dominik Rauh, Gebsattel (DE)

(73) Assignee: Electrolux Home Products Corporation N.V., Zaventem (BE)

( * ) Notice: Subject to any disclaimer, the term of this patent is extended or adjusted under 35 U.S.C. 154(b) by 980 days.

(21) Appl. No.: 12/513,549

(22) PCT Filed: Nov. 8, 2007

(86) PCT No.: PCT/EP2007/009679
§ 371 (c)(1), (2), (4) Date: May 5, 2009

(87) PCT Pub. No.: WO2008/061634
PCT Pub. Date: May 29, 2008

(65) Prior Publication Data
US 2010/0021606 A1    Jan. 28, 2010

(30) Foreign Application Priority Data
Nov. 24, 2006    (EP) .................................... 06024379

(51) Int. Cl.
*A23L 1/22*    (2006.01)
*F24C 7/08*    (2006.01)

(52) U.S. Cl.
CPC ........................................ *F24C 7/08* (2013.01)

(58) Field of Classification Search
CPC ........................................................ F24C 7/08
USPC ................ 426/231, 232, 233, 523; 219/712; 99/328
See application file for complete search history.

(56) References Cited

U.S. PATENT DOCUMENTS

| 6,299,921 B1 * | 10/2001 | Loffler et al. ................. 426/233 |
| 6,753,027 B1 | 6/2004 | Greiner et al. |
| 2004/0115325 A1 * | 6/2004 | Greiner et al. ................. 426/523 |

FOREIGN PATENT DOCUMENTS

| EP | 1021979 A1 | 7/2000 |
| GB | 2 203 320 | * 4/1988 ............... H05B 6/68 |
| WO | 9316333 A | 8/1993 |

OTHER PUBLICATIONS

International Search Report for PCT/EP2007/009679, dated Jan. 17, 2008, 2 pages.

* cited by examiner

*Primary Examiner* — Rena L Dye
*Assistant Examiner* — Chaim Smith
(74) *Attorney, Agent, or Firm* — Pearne & Gordon LLP

(57) ABSTRACT

The invention relates to a method for determining the residual time until a cooking process of a foodstuff (12) has been finished. At first a set temperature value for a core (14) of the foodstuff (12) is defined. Next the actual temperatures in the core (14) of the foodstuff (12) at predetermined times are measured and the time dependence of the measured temperature in the core (14) of the foodstuff (12) is determined. At last the time dependence of the measured temperature is compared with the set temperature value and "the residual time of the cooking process is estimated. The invention relates further to a corresponding apparatus for determining the residual time until a cooking process of a foodstuff (12) has been finished.

21 Claims, 2 Drawing Sheets

Figure 1:
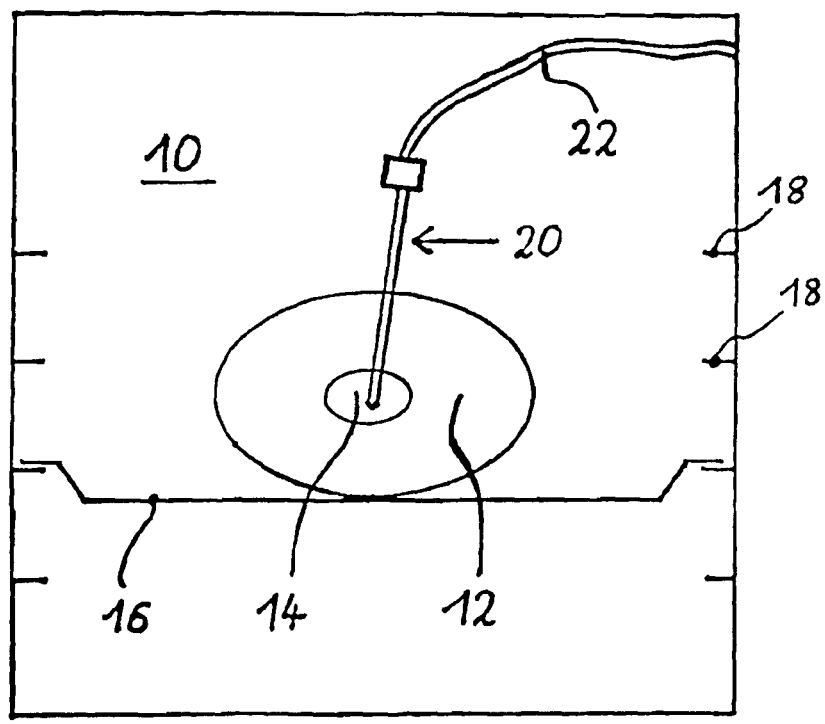

METHOD AND AN APPARATUS FOR DETERMINING THE RESIDUAL TIME UNTIL A COOKING PROCESS OF A FOODSTUFF HAS BEEN FINISHED

The present invention relates to a method for determining the residual time until a cooking process of a foodstuff has been finished. Further the present invention relates to an apparatus for determining the residual time until a cooking process of a foodstuff has been finished. In addition the present invention relates to an oven provided to perform the above method. Finally the present invention relates to an oven comprising the above apparatus.

When the foodstuff is cooked, normally the user switches off the heating elements after a defined time. This time rests on the experience of the user or is taken from a cookery book. In this case the user does not know how the actual consistency of the foodstuff will be.

The temperature inside the foodstuff indicates its consistency. The user may apply a food probe and measure the temperature in the core of the foodstuff. Then he can check, if the cooking process has been finish or not. However, the user cannot find out the residual time until the cooking process of the foodstuff has been finished. It is desired to have an information, when the foodstuff will be ready.

It is an object of the invention to provide a method and an apparatus for determining the residual time until a cooking process of a foodstuff has been finished.

This object is achieved by the method according to claim 1.

According to the present invention the method for determining the residual time until a cooking process of a foodstuff has been finished comprises the following steps:
 a) defining a set temperature value for a core of the foodstuff,
 b) measuring the actual temperatures in the core of the foodstuff at predetermined times,
 c) determining the time dependence of the measured temperature in the core of the foodstuff,
 d) comparing the time dependence of the measured temperature with the set temperature value, and
 e) estimating the residual time of the cooking process.

The main idea of the invention is that the actual temperatures in the core of the foodstuff are measured at several times, so that the time development of the temperature is regularly monitored. Then the temperature is given as a function of the time. By comparing said function with the set temperature value the estimated residual time is determined. If the set temperature value has been defined and the oven has been started, then the user gets after some time a prediction, when the core of the foodstuff will reach the set temperature value.

According to a further aspect of the invention the steps a) to d) are repeated and the estimated residual time of step e) is updated. This allows a correction of the estimated residual time during the cooking process.

Especially the steps a) to d) are repeated and the estimated residual time of step e) is updated regularly after a predetermined time-lag. The residual time may be corrected an arbitrary number of times.

For example, the actual temperature in the core of the food-stuff is measured continuously, so that the time dependence of the temperature is a continuous function. In this case the temperature as a function of the time may be determined directly.

Alternatively the actual temperatures in the core of the foodstuff are measured discretely, so that the time dependence of the temperature is a discrete function. Also the temperature as discrete function of the time may provide an information allowing the determination of the estimated residual time.

Further the time dependence of the measured temperature may be determined by an interpolation of said discrete function, so that the time dependence becomes a continuous function. This is another way to get the continuous function.

According to the preferred embodiment of the present invention the cooking process is stopped after the estimated time, if the deviation of the set temperature value and the actual temperature in the core of the foodstuff is less than a predetermined deviation value, and if the actual residual time is less than a predetermined time value. The cooking process may be automatically stopped. In this case the cooking process will not be stopped, if the temperature in the core reaches the set temperature value.

For example, said predetermined deviation value is between 0% and 10%, in particular about 5%. Further said predetermined time value may be between 10% and 30%, in particular about 20%, of the total time for the cooking process.

According to a further preferred embodiment of the present invention the cooking process is stopped, if the actual temperature in the core of the foodstuff is higher than the set temperature value plus a predetermined additional value. For example, said predetermined additional value is between 0% and 5%, in particular about 2,5%, of the set temperature value.

The set temperature value is manually defined or definable by the user. The user may define the set temperature value in dependence of the kind and the properties of the foodstuff.

Alternatively the set temperature value is automatically defined or definable on the basis of the kind, quantity and/or shape of the foodstuff. In particular, the set temperature value is automatically defined or definable by a control unit.

Further the time dependence of the measured temperature in the core of the foodstuff may be determined by the control unit. The control unit allows a fast determination of the temperature as a function of the time.

In addition the time dependence of the measured temperature and the set temperature value may be compared and the residual time of the cooking process is estimated by the control unit.

In the preferred embodiment the value of the residual time of the cooking process is displayed. So the user is always informed about the residual time.

The temperature in the core of the foodstuff is preferably measured by a food probe. The food probe may be inserted into the core of the foodstuff, so that the temperature in the core of the foodstuff can easily be measured.

The object of the present invention is further achieved by the apparatus according to claim 21.

The apparatus for determining the residual time until a cooking process of a foodstuff has been finished comprises a food probe for measuring the actual temperatures in a core of the foodstuff and a control unit. The control unit is provided to determine the residual time of the cooking process on the basis of the time dependence of the measured temperature in the core of the foodstuff.

According to a further aspect of the present invention the control unit is provided to use further a set temperature value to determine the residual time of the cooking process. The set temperature value depends on the kind, quantity and/or shape of the foodstuff.

The control unit may be realized by hardware and/or software components. For example, the control unit comprises at least one microprocessor.

The control unit and the food probe may be connected by at least one cable. The cable is a cheap and safe electric connection for transferring the signals corresponding to the temperatures in the core of the foodstuff.

Alternatively the food probe and the control unit comprise means for a wireless connection between the food probe and the control unit. For example, the food probe comprises a transmitter for infrared and/or radio signals.

At last the present invention relates to an oven for cooking a foodstuff, which is provided for the method described above. Further the oven for cooking a foodstuff may comprise the above apparatus for determining the residual time until a cooking process of a foodstuff has been finished.

The novel and inventive features believed to the characteristic of the present invention are set forth in the appended claims.

Figure 2:
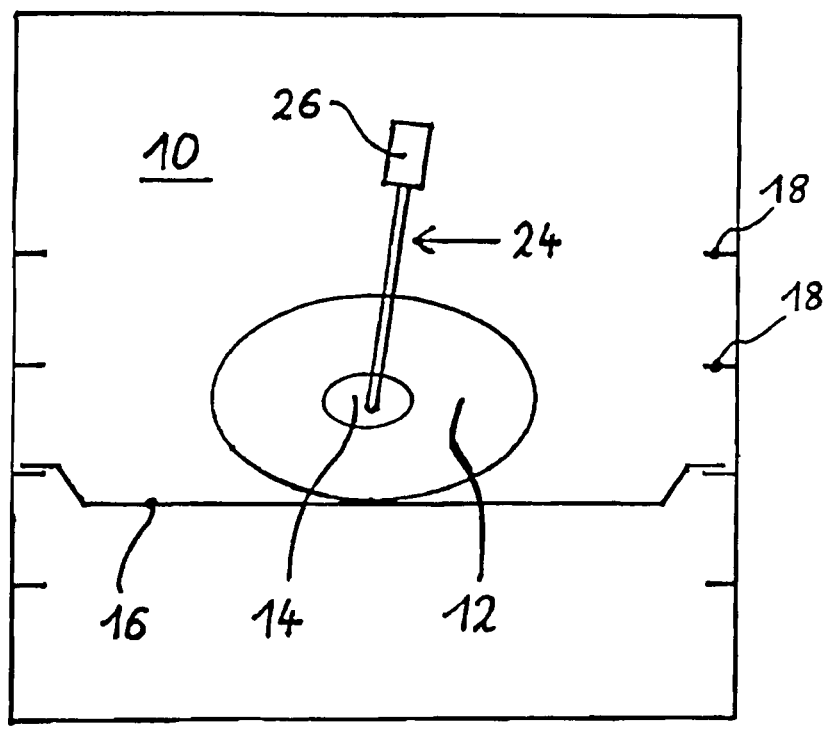

The invention will be described in further detail with reference to the drawing, in which FIG. 1 illustrates a schematic sectional front view of a cooking space with a foodstuff and a food probe according to a first embodiment of the invention, and FIG. 2 illustrates a schematic sectional front view of a cooking space with a foodstuff and a food probe according to a second embodiment of the invention.

FIG. 1 illustrates a schematic sectional front view of a cooking space 10 of an oven. In the cooking space 10 there is a foodstuff 12, which may be a piece of meat or a cake, for example. The foodstuff 12 is on a gridiron 16 or on a pie tin 16. The gridiron 16 or pie tin 16, respectively, is supported by a pair of slides 18.

A food probe 20 comprises a long thin rod, which is inserted into the foodstuff 12, so that the temperature-sensitive portion of the food probe 20 is in the core 14 of the foodstuff 12. The food probe 20 measures the actual temperature in a core 14 of the foodstuff 12. The food probe 20 is connected via a cable 22 with a control unit. The control unit is not explicitly shown in FIG. 1.

The food probe 20 measures the actual temperatures in the core 14 of the foodstuff 12. The values of the temperature are sent as electric or electronic signals via the cable 22 to the control unit. The behaviour of the temperature as a function of the time is determined by the control unit.

The actual temperature in the core 14 of the foodstuff 12 is measured at several times. If the actual temperatures are measured continuously, then the time dependence of the temperature is given directly. If the actual temperatures are measured discretely, then the time dependence is determined by an interpolation of the discrete temperature values. The measure points for temperature are interpolated to a curve corresponding to the time dependence of the temperature.

The further timely development of the temperature in the core 14 of the foodstuff 12 is evaluated by an extrapolation of the measured time dependence.

A set temperature value is defined by the user and put in to the control unit. The set temperature value may be defined by the user manually. Alternatively the set temperature value may be determined by the control unit on the basis of parameters put in by the user. Such parameters may be the kind, the shape and/or the quantity of the foodstuff 12.

By comparing said further timely development of the temperature with the set temperature value the control unit estimates the residual time of the cooking process. This prediction is updated during the whole cooking process.

The control unit is an electronic circuit and may be realized by hardware and/or software components.

FIG. 2 illustrates a schematic sectional front view of the cooking space with the foodstuff 12 and a food probe 24 according to a second embodiment of the invention. The difference between the first and second embodiment is the type of the food probe 24. The food probe 24 of the second embodiment comprises a transmitter 26 instead of the cable 22 in the first embodiment. The food probe 24 of the second embodiment is wireless connected to the control unit. Therefore the signals corresponding to the measured temperatures are transmitted wireless form the food probe 24 to the control unit. The transmission of the temperature may be realized by infrared or radio signals, for example.

List Of Reference Numerals
10 cooking space
12 foodstuff
14 core
16 gridiron, pie tin
18 slide
20 food probe
22 cable
24 food probe
26 transmitter

The invention claimed is:

1. A method for determining the residual time until a cooking process of a foodstuff provided to a cooking space of cooking appliance has been finished, wherein said method comprises the following steps:
   a) using a control unit provided to the cooking appliance, defining a set temperature value for a core of the foodstuff,
   b) measuring an actual temperature in the core of the foodstuff at predetermined times during the cooking process using a food probe inserted into the foodstuff and operatively connected to communicate with the control unit,
   c) determining a time dependence of the measured temperature in the core of the foodstuff based on the actual temperatures measured using the food probe,
   d) using the control unit, comparing the time dependence of the measured temperature with the set temperature value, and
   e) using the control unit, calculating an estimate of a residual time remaining until the cooking process being conducted on the foodstuff will be finished,
   wherein steps a) to e) are repeated and the estimate of the residual time of step e) updated occasionally during the cooking process to establish an updated estimate of the residual time and a value of the updated estimate of the residual time of the cooking process is displayed, and
   wherein the cooking process is stopped in response to determination of all of: (i) at least one updated estimate of the residual time has passed, (ii) a deviation of the set temperature value from the actual temperature in the core of the foodstuff is less than predetermined deviation value, and (iii) a subsequent update of the estimated residual time expires before a next one of said predetermined times at which the actual temperature in the core of the foodstuff is to be measured using the food probe.

2. A method according to claim 1, wherein steps a) to d) are repeated and the estimated residual time of step e) is updated regularly after a predetermined time-lag.

3. A method according to claim 1, wherein the actual temperatures in the core of the foodstuff are measured continuously, so that the time dependence of the measured temperature is a continuous function.

4. A method according to claim 1, characterized in, that the actual temperatures in the core of the foodstuff are measured discretely, so that the time dependence of the measured temperature is a discrete function.

5. A method according to claim 4, wherein the time dependence of the measured temperature is determined by an interpolation of said discrete function, so that the time dependence becomes a continuous function.

6. A method according to claim 1, wherein the residual time of the cooking process is estimated by extrapolating the time dependence of the measured temperature.

7. A method according to claim 1, wherein said predetermined deviation value is between 0% and 10%.

8. A method according to claim 1, wherein each time of said predetermined times is between 10% and 30% of the total time for the cooking process.

9. A method according to claim 1, wherein the set temperature value is manually defined or definable by a user.

10. A method according to claim 1, wherein the set temperature value is automatically defined or definable on the basis of the kind, quantity and/or shape of the foodstuff.

11. A method according to claim 10, wherein the set temperature value is automatically defined or definable by the control unit.

12. A method according to claim 11, wherein the time dependence of the measured temperature in the core of the foodstuff is determined by the control unit.

13. A method according to claim 11, wherein the time dependence of the measured temperature and the set temperature value are compared by the control unit.

14. A method according to claim 11, wherein the residual time of the cooking process is estimated by the control unit.

15. A method according to claim 1, wherein the actual temperatures in the core of the foodstuff are measured by a food probe.

16. A method according to claim 1, wherein said predetermined deviation value is about 5%.

17. A method according to claim 1, wherein each time of said predetermined times is about 20% of a total time for the cooking process.

18. A method according to claim 1, wherein the cooking process is stopped when the actual temperature in the core of the foodstuff is higher than the set temperature value plus a predetermined additional value.

19. A method for determining the residual time until a cooking process of a foodstuff provided to a cooking space of a cooking appliance has been finished, wherein said method comprises the following steps:
   a) using a control unit provided to the cooking appliance, defining a set temperature value for a core of the foodstuff,
   b) measuring an actual temperature in the core of the foodstuff at predetermined times during the cooking process using food probe inserted into the foodstuff and operatively connected to communicate with the control unit,
   c) determining a time dependence of the measured temperature in the core of the foodstuff based on the actual temperatures measured using the food probe,
   d) using the control unit, comparing the time dependence of the measured temperature with the set temperature value, and
   e) using the control unit, calculating an estimate of residual time remaining until the cooking process being conducted on the foodstuff will be finished,
   wherein steps a) to e) are repeated and the estimate of the residual time of steps e) is updated occasionally during the cooking process to establish an updated estimate of the residual time and a value of the updated estimate of the residual time of the cooking process is displayed, and
   wherein the cooking process is stopped, when the actual temperature in the core of the foodstuff is higher than the set temperature value plus a predetermined additional value.

20. A method according to claim 19, wherein said predetermined additional value is between 0% and 5% of the set temperature value.

21. A method according to claim 19, wherein said predetermined additional value is about 2.5% of the set temperature value.

* * * * *

UNITED STATES PATENT AND TRADEMARK OFFICE
CERTIFICATE OF CORRECTION

| | | |
|---|---|---|
| PATENT NO. | : 9,017,751 B2 | |
| APPLICATION NO. | : 12/513549 | |
| DATED | : April 28, 2015 | |
| INVENTOR(S) | : Dominik Rauh | |

It is certified that error appears in the above-identified patent and that said Letters Patent is hereby corrected as shown below:

In the specification, column 2, line 27, please replace "2,5%," with -- 2.5%, --

In the claims, column 4, claim 4, line 64, please replace "characterized in, that" with -- wherein --

Signed and Sealed this
Twenty-third Day of February, 2016

Michelle K. Lee
*Director of the United States Patent and Trademark Office*